US008326290B2

(12) United States Patent
Mortti et al.

(10) Patent No.: US 8,326,290 B2
(45) Date of Patent: Dec. 4, 2012

(54) METHOD AND APPARATUS FOR EFFICIENT SCANNING AND OPERATION IN A WIRELESS SYSTEM

(75) Inventors: Juha Mortti, Oulu (FI); Pekka Vayrynen, Oulu (FI); Veijo Harkonen, Oulu (FI); Virpi Juusola, Oulu (FI); Jan Suumaki, Tampere (FI); Veli-Pekka Junttila, Oulu (FI); Lars Dalsgaard, Oulu (FI); Juha Karvinen, Lempäälä (FI); Mikko Jaakkola, Lempäälä (FI)

(73) Assignee: Nokia Corporation, Espoo (FI)

( * ) Notice: Subject to any disclaimer, the term of this patent is extended or adjusted under 35 U.S.C. 154(b) by 585 days.

(21) Appl. No.: 11/333,856

(22) Filed: Jan. 17, 2006

(65) Prior Publication Data
US 2006/0179365 A1    Aug. 10, 2006

Related U.S. Application Data

(60) Provisional application No. 60/650,852, filed on Feb. 7, 2005.

(51) Int. Cl.
*H04W 4/00* (2009.01)

(52) U.S. Cl. .................. 455/434; 455/435.1; 455/435.2; 455/435.3; 455/160.1; 455/161.1; 455/161.2; 455/161.3; 455/454; 455/572; 455/573; 455/574; 455/575.3; 455/575.4

(58) Field of Classification Search .................. 455/454, 455/575.3, 575.4, 432.1–435.3, 160.1–161.3, 455/572–574
See application file for complete search history.

(56) References Cited

U.S. PATENT DOCUMENTS

| 7,444,150 | B2 * | 10/2008 | Rick et al. ..................... 455/436 |
| 2002/0164979 | A1 * | 11/2002 | Mooney et al. ............... 455/417 |
| 2002/0177464 | A1 * | 11/2002 | Swerup et al. ................ 455/550 |
| 2004/0033812 | A1 * | 2/2004 | Matsunaga et al. ........... 455/557 |
| 2004/0073901 | A1 * | 4/2004 | Imamatsu ..................... 717/170 |
| 2004/0224689 | A1 * | 11/2004 | Raghuram et al. ......... 455/435.3 |
| 2005/0025182 | A1 * | 2/2005 | Nazari .......................... 370/469 |

\* cited by examiner

*Primary Examiner* — Dwayne Bost
*Assistant Examiner* — Yungsang Lau
(74) *Attorney, Agent, or Firm* — Banner & Witcoff Ltd.

(57) ABSTRACT

The techniques described increase efficiency and operation of a device operating in one or more communication systems. These embodiments provide a method for a device to perform selected scanning procedures of one or more communication systems based on the type of event detected by the device. One method includes detection of the opening or closing of the flip cover of the device and performing scanning as a result of detecting the event. Another method performs scanning in different modes such as high-scan, medium-scan and low-scan modes.

21 Claims, 5 Drawing Sheets

METHOD AND APPARATUS FOR EFFICIENT SCANNING AND OPERATION IN A WIRELESS SYSTEM

CROSS-REFERENCE TO RELATED PATENT APPLICATIONS

The present application claims priority to U.S. Provisional Patent Application No. 60/650,852, filed Feb. 7, 2005 and incorporated by reference in its entirety.

FIELD OF THE INVENTION

The present invention relates generally to apparatus and methods associated with operation in one or more wireless systems such as Global System for Mobile communications (GSM), General Packet Radio System (GPRS), GSM/Enhanced Data rates for GSM Evolution Radio Access Network (GERAN) system, Universal Mobile Telecommunications System (UMTS), Wireless Local Area Network (WLAN) system and Unlicensed Mobile Access (UMA) system.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Recently, there has been a great increase in the use of devices, for operation in wireless systems, such as GSM, GERAN and WLAN systems. These devices, and the methods of operation of these devices, are tailored for efficient and optimal operation in the system that they are meant to be primarily operated and used in. These devices and the methods, however, are not supportive of efficient and seamless operation in two or more such systems, such as in the GSM system and the WLAN system.

SUMMARY OF THE INVENTION

The various embodiments presented in the invention, enable efficient and seamless operation of the device in the one or more systems, such as GSM, WLAN, UMA, and UTRAN, that it is intended to be operated and used in. The various embodiments described herein enable, for instance, optimal use of power in the device, the seamless, quick and rapid determination of whether to switch systems, and rapid switching of systems when such a determination results in a decision to switch systems.

In one aspect of the invention, the timing and method of scanning of the various systems that the device is capable of being used and operated in, is optimized. In another aspect of the invention, different events cause the initiation of different types of scanning methods of the one or more systems, in order to optimize the performance of the device.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
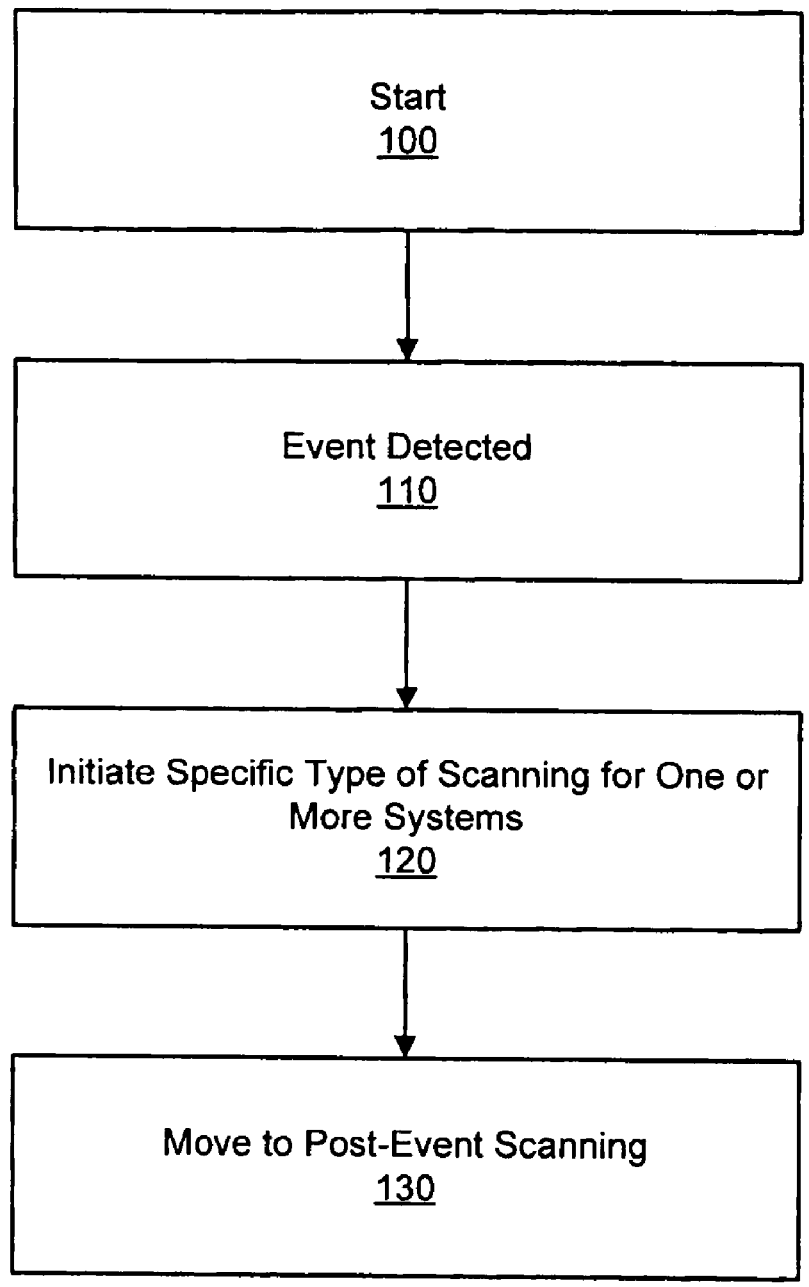
FIG. 1 is a flow chart showing steps involved in the implementation of a first embodiment of the present invention.

One exemplary embodiment relates to the device and the method of performing scanning of the one or more systems within which the device is capable of operating. The method includes identification of certain events that cause the scanning of the one or more systems to be initiated. Each event is associated with a type of scanning mode. One or more events may be associated with the same or similar scanning mode. Subsequent to the scanning of the one or more systems, the method includes the device operating in a post-event mode. The scanning in the post-event mode may be based on the type of event which caused the scanning of the one or more systems.

In another exemplary embodiment, there is a plurality of scanning modes, preferably three, in the device. These modes may be referred to, for example, as a high-scan mode, a medium-scan mode and a low-scan mode. When the device is in the high-scan mode, scanning occurs every 6th second. The high-scan mode lasts for a minute, and after the end of a minute, the multi-mode capable device moves to the medium-scan mode. When the device is in the medium-scan mode, scanning happens every $2^{nd}$ minute and lasts 2 hours. At the end of the 2 hours, the multi-mode capable device moves to the low-scan mode. In the low-scan mode, scanning occurs every 30th minute, and the low-scan mode lasts indefinitely until some other event occurs. These scanning modes, for example, are modes of scanning in WLAN capable multi-mode devices. Further, the exact values for the time interval between scans within a mode, for instance every $6^{th}$ second or $2^{nd}$ minute, the period over which a scan-mode is effective, for example one minute or 2 hours, and the subsequent mode to which the device moves to, for example from high-scan mode to medium-scan mode, are representative and can have other values than those stated herein without departing from the spirit of the invention.

In another exemplary embodiment, when the user opens or closes the flip of the device, the device performs a limited number of scans, preferably only one, for one or more systems. If the outcome of the scan is either that the system could not be found or that the system is unsuitable, for any reason, then the device moves back to the scan mode that it was in prior to the occurrence of the event where the user opens or closes the flip of the device. An example of this embodiment is a multi-mode capable device operating in a GERAN system in the low-scan mode; when the user flips open the device, the device scans for one or more WLAN systems; if the scan does not find a WLAN system, then the device returns to the low-scan mode.

In another exemplary embodiment, the device performs the same method as in the preceding embodiment in response to the user deactivating the keypad lock.

In another exemplary embodiment, the device initiates one or more scans, preferably one, for one or more systems, when the device or the device's keypad is not locked, and when the device senses an event wherein the user has pressed any of the keys other than the volume or power keys. If the outcome of the scan is either that the system could not be found or that the system is unsuitable, for any reason, then the device moves back to the scan mode that it was in prior to the occurrence of the event wherein the device sensed that the user had pressed any of the keys other than the volume or power keys. An example of this embodiment is the case where a device is operating in a system, for instance a GERAN system, is in the low-scan mode, detects that the user has pressed a key, other than the power or volume keys, scans for one or more systems, for instance, WLAN, and upon failing to find the system, returns to the low-scan mode.

In another exemplary embodiment, the device initiates one or more scans, preferably one, for one or more systems, when the device detects or senses that a charger is plugged in or connected to the device. This scan may be performed independently of whether the keypad is locked or not. If the outcome of the scan is either that the system could not be found or that the system is unsuitable, for any reason, then the device moves back to the scan mode that it was in prior to the occurrence of the event wherein the device detects or senses that a charger is plugged in or connected to the device. An example of this embodiment is the case where a device is operating in a system, for instance, a WLAN system, is in the low-scan mode, detects or senses that a charger is plugged in, scans for one or more systems, for instance, UTRAN, and upon failing to find the system, returns to the low-scan mode.

In another exemplary embodiment, the device has previously initiated one or more scans, preferably a high-scan mode, for one or more systems when the device detects or senses an event, such as that a charger is un-plugged or disconnected from the device. In this embodiment, the device exits the scan mode that the device was in prior to the charger being unplugged from the device, and initiates a scan in the high-scan mode. The one or more scans are then followed by a less frequent scan mode, such as low-scan mode. An example of this embodiment is the case where a device is operating in a system, for instance a WLAN system, detects or senses that a charger is un-plugged from the device, scans one or more times, in the high-scan mode, for one or more systems, for instance, WLAN and/or UTRAN, and subsequently moves to a less frequent scanning mode such as the medium-scan or low-scan mode.

It should be noted that the device would preferably not perform a scan in response to a second event occurring immediately following a first event. For instance, if a scan is performed as a result of the flip being opened on the device, then a scan will preferably not be performed as a result of a key being pressed immediately following the opening of the flip on the device.

FIG. 1 is a flow chart showing a process for implementing one embodiment of the present invention in a multi-mode device. The process is initiated at step 100 in FIG. 1. At step 110, an event is detected. At step 120, a specific type of scanning is initiated. The specific type of scanning is based upon the event that is detected. One or more scans of the system occur at this step. At step 130, the system moves to post-event scanning. The post-event scanning may be based upon the type of event that has occurred.

Figure 2:
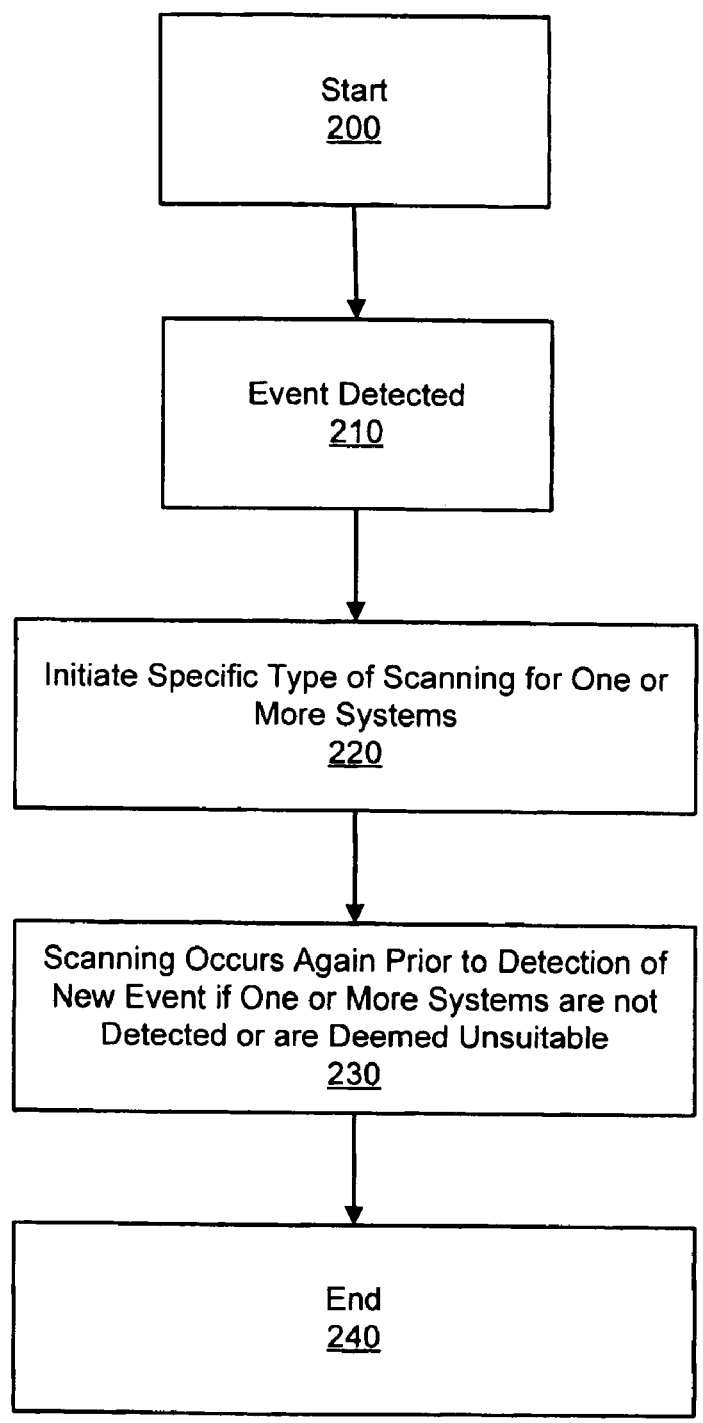
FIG. 2 is a flow chart showing steps involved in the implementation of a second embodiment of the present invention.

FIG. 2 is a flow chart showing a process for implementing a second embodiment of the present invention in a device. At step 200, the process is initiated. At step 210, an event is detected. At step 220, a specific type of scanning is initiated. The specific type of scanning is based upon the event that is detected. One or more scans of the system occur at this step. After the scan or scans is completed, at step 230, the device returns to a scanning mode prior to the detection of another event if one or more systems are not detected or are deemed to be unsuitable. The process is terminated at step 240.

Figure 3:
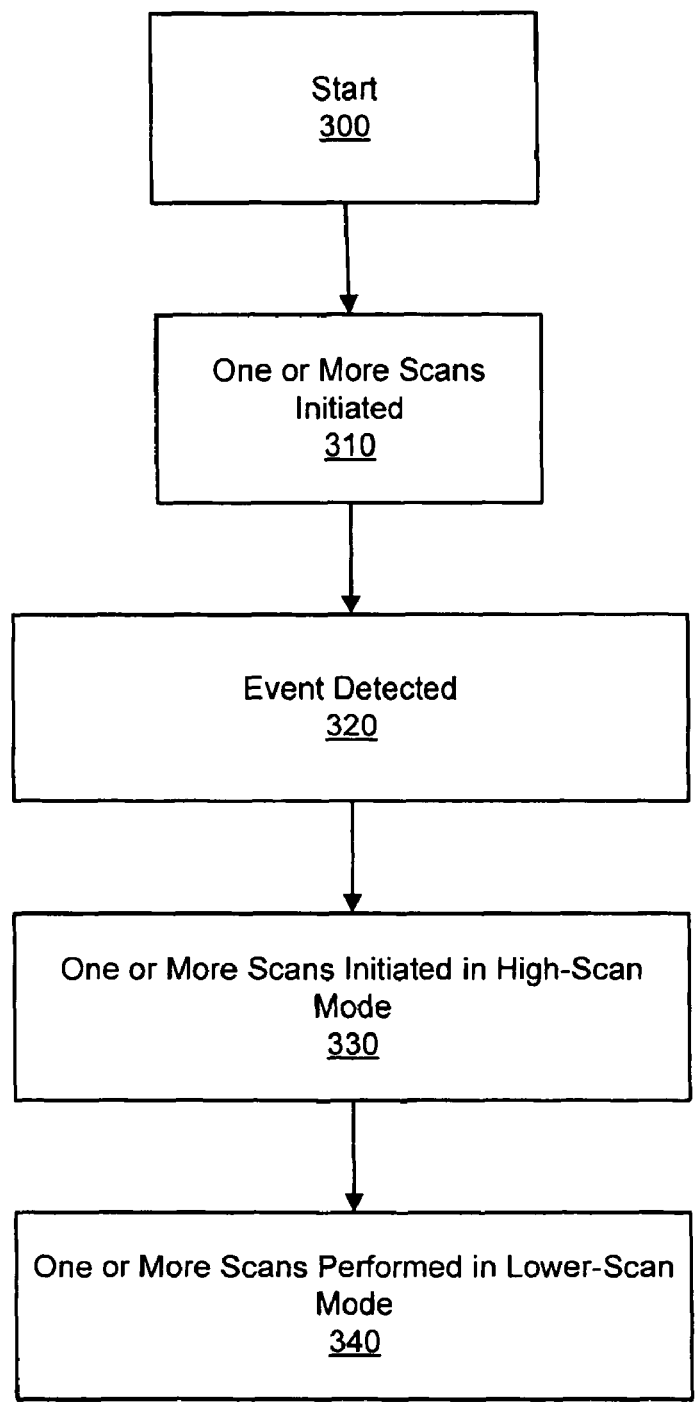
FIG. 3 is a flow chart showing steps involved in the implementation of a third embodiment of the present invention.

FIG. 3 is a flow chart showing a process for implementing a third embodiment of the present invention in a device. At step 300, the process is initiated. At step 310, the device initiates one or more scans. At step 310, an event is detected. This event can comprise, for example, the device's charger being unplugged from the device. At step 320, the device exits the scan mode that the device was in prior to the event. At step 330, the device initiates one or more scans in the high-scan mode. The one or more scans are then followed at step 340 by a less frequent scan mode, such as low-scan mode.

Figure 4:
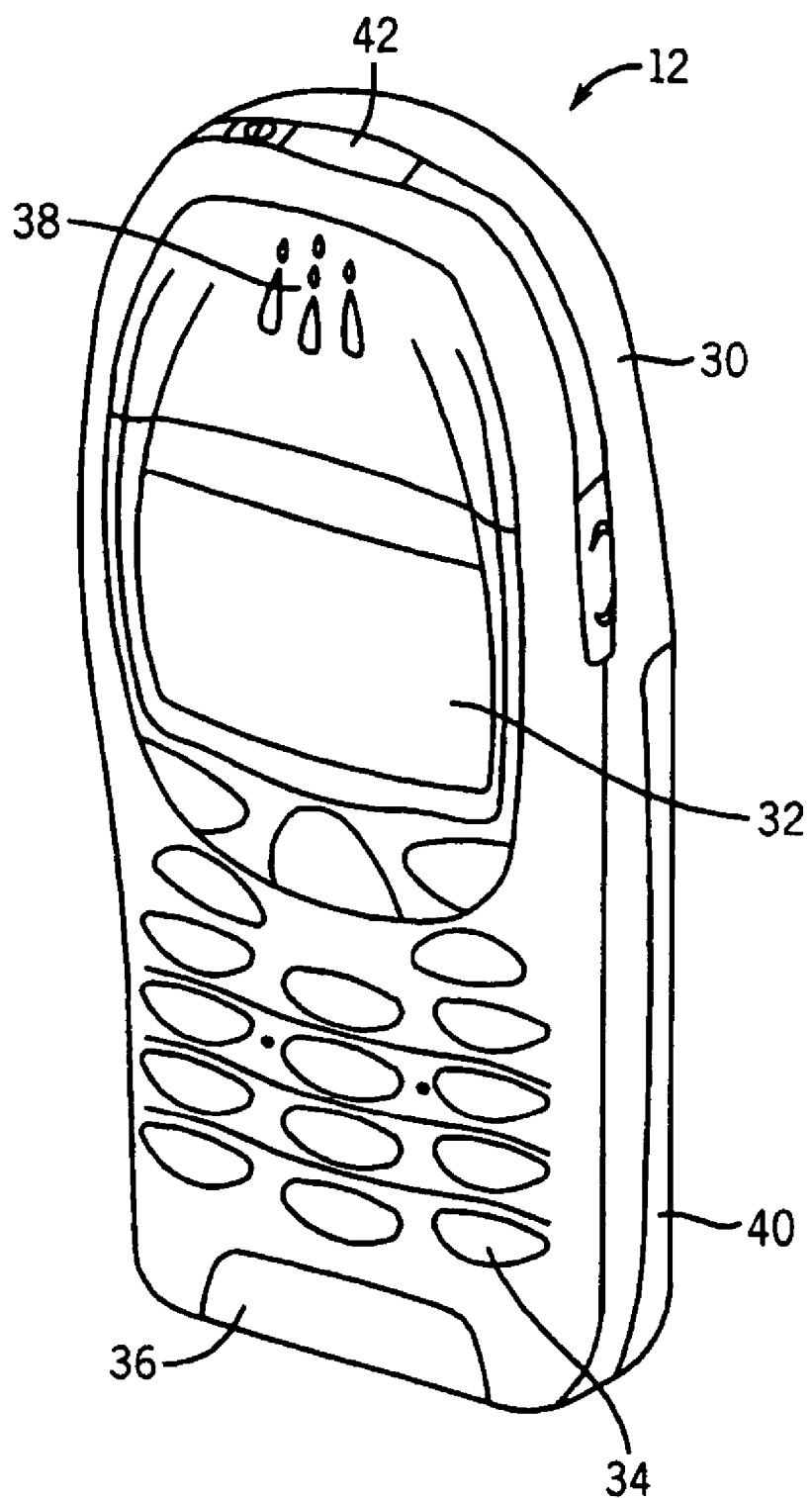
FIG. 4 is a perspective view of an electronic device that can be used in the implementation of the present invention.
Figure 5:
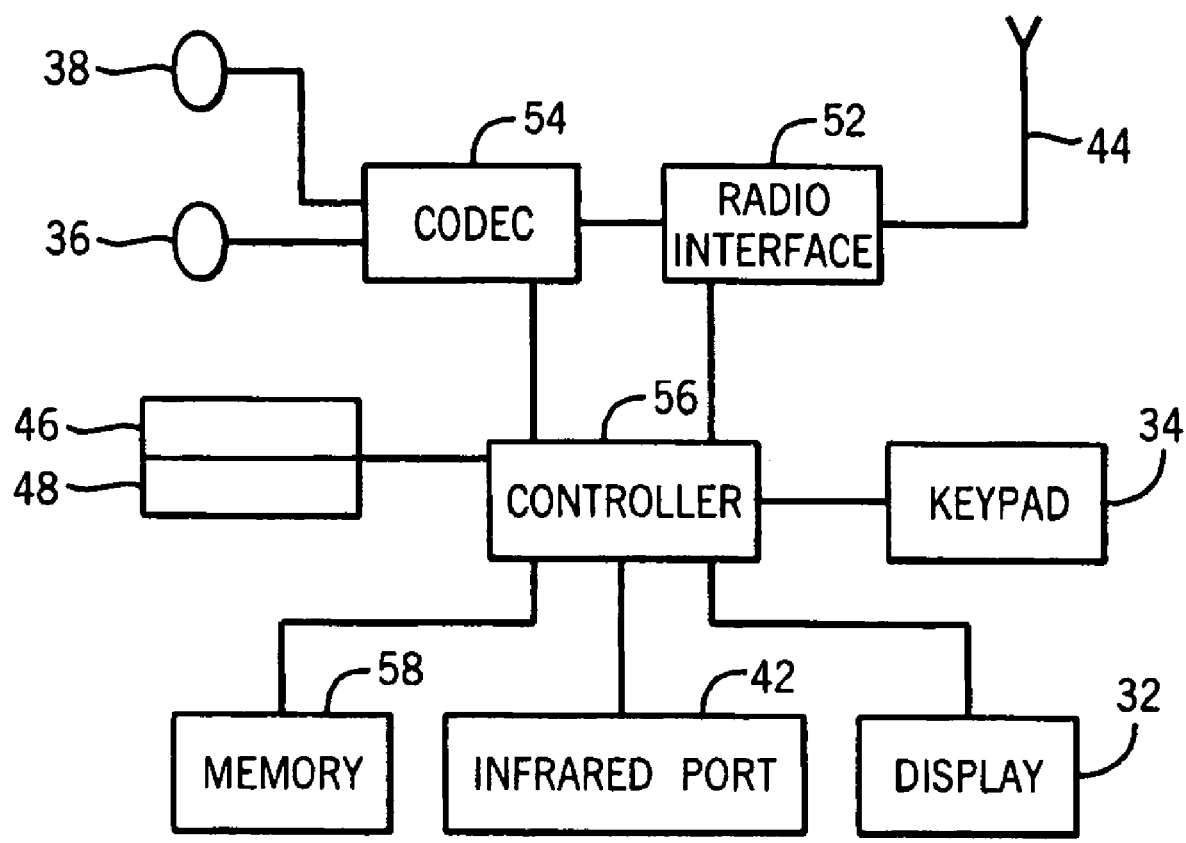
FIG. 5 is a schematic representation of the telephone circuitry of the mobile telephone of FIG. 4.

FIGS. 4 and 5 show one representative electronic device 12 within which the present invention may be implemented. It should be understood, however, that the present invention is not intended to be limited to one particular type of electronic device. The electronic device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated. The invention is not limited to a particular embodiment, but extends to various modifications, combinations, and permutations that nevertheless fall within the scope and spirit of the appended claims.

What is claimed is:

1. A method, comprising:
   storing, in a device configured to operate in a plurality of communication systems, data defining a plurality of events, and associating each of the plurality of events with a type of scanning mode, wherein at least two of the plurality of events are associated with the same scanning mode;

detecting an event at the device, the detected event corresponding to one of the plurality of events;

responsive to detecting the event, initiating a first scanning for a signal from a first of the plurality of communication systems providing communication via a local area network, wherein the first scanning is performed in a manner based on a property of the detected event; and performing post-event second scanning for a signal from a second of the plurality of communication systems providing communication via a cellular network, wherein the second scanning is performed at a rate lower than a rate of the first scanning, wherein the post-event second scanning is based on the property of the detected event.

2. The method of claim 1, wherein the detected event is detected based on determining that a flip cover of the device has been closed.

3. The method of claim 1, wherein the detected event is detected based on determining that a key other than a volume key or a power key of the device has been pressed.

4. The method of claim 1, wherein the detected event is detected based on determining that the device has been connected to a charger and that a keypad of the device is unlocked.

5. A method, comprising:
storing, in a device configured to operate in a plurality of communication systems, data defining a plurality of events, and associating each of the plurality of events with a type of scanning mode, wherein at least two of the plurality of events are associated with the same scanning mode;

detecting an event at the device, the detected event corresponding to one of the plurality of events;

responsive to detecting the event, performing a scan in a first scan mode for a signal from a first of the plurality of communication systems based on a property of the detected event, the first mode having a first scan rate and the first communication system providing communication via a cellular network; and subsequent to performing the scan in the first scan mode, performing one or more scans in a second scan mode for a signal from a second of the plurality of communication systems providing communication via a local area network, the second scan mode having a second scan rate lower than the scan rate of the first scan rate of the first scan mode, wherein the second scan mode is based on the property of the detected event, and wherein the plurality of communication systems comprises a WLAN communication system and at least one of a GSM communication system, a UMA communication system, and a UTRAN communication system.

6. A non-transitory computer-readable storage medium storing computer-executable code that, when executed, causes a device at least to:

store data defining a plurality of events, and associate each of the plurality of events with a type of scanning mode, wherein at least two of the plurality of events are associated with the same scanning mode and the device is configured to operate in a plurality of communication systems;

detect an event at the device, the detected event corresponding to one of the plurality of events;

responsive to detecting the event, initiate a first scanning for a signal from a first of the plurality of communication systems providing communication via a local area network, wherein the first scanning is performed in a manner based on a property of the detected event; and perform post-event second scanning for a signal from a second of the plurality of communication systems providing communication via a cellular network, wherein the post-event second scanning is performed at a rate lower than a rate of the first scanning, wherein the post-event second scanning is based on the property of the detected event.

7. The non-transitory computer-readable storage medium of claim 6, wherein the detected event is detected based on determining that a flip cover of the device has been closed.

8. The non-transitory computer-readable storage medium of claim 6, wherein the detected event is detected based on determining that a key other than a volume key or a power key of the device has been pressed.

9. The non-transitory computer-readable storage medium of claim 6, wherein the detected event is detected based on determining that the device has been connected to a charger and that a keypad of the device is unlocked.

10. A non-transitory computer-readable storage medium storing computer-executable code that, when executed, causes a device at least to:

store data defining a plurality of events, and associate each of the plurality of events with a type of scanning mode, wherein at least two of the plurality of events are associated with the same scanning mode and wherein the device is configured to operate in a plurality of communication systems;

detect an event, the detected event corresponding to one of the plurality of events;

responsive to detecting the event, perform a scan in a first scan mode for a signal from a first of the plurality of communication systems based on a property of the detected event, the first scan mode having a first scan rate and the first communication system providing communication via a cellular network; and subsequent to performing the scan in the first scan mode, perform one or more scans in a second scan mode for a signal from a second of the plurality of communication systems providing communication via a local area network, the second scan mode having a second scan rate lower than the first scan rate of the first scan mode, wherein the second scan mode is based on the property of the detected event.

11. An apparatus, comprising:
a controller; and
a memory unit communicatively connected to the controller and storing computer-executable code, the memory and the computer-executable code, along with the controller, configured to cause the apparatus at least to:

store data defining a plurality of events and associate each of the plurality of events with a type of scanning mode, wherein at least two of the plurality of events are associated with the same scanning mode and the apparatus is configured to operate in a plurality of communication systems;

detect an event at the apparatus, the detected event corresponding to one of the plurality of events;

responsive to detecting the event, initiate a first scanning for a signal from a first of the plurality of communication systems providing communication via a local area network, wherein the scanning is performed in a manner based on a property of the detected event; and perform post-event second scanning for a signal from a second of the plurality of communication systems providing communication via a cellular network, wherein the second scanning is performed at a rate lower than a rate of the first scanning, and wherein the second scanning is based on the property of the detected event.

12. An apparatus, comprising:

a controller; and a memory unit communicatively connected to the controller and storing computer-executable code, the memory and the computer-executable code, along with the controller, configured to cause the apparatus at least to:

store, data defining a plurality of events and associate each of the plurality of events with a type of scanning mode, wherein at least two of the plurality of events are associated with the same scanning mode and the apparatus is configured to operate in a plurality of communication systems;

detect an event corresponding to one of the plurality of events;

responsive to detecting the event, perform a scan in a first scan mode for a signal from a first of the communication systems based on a property of the detected event, the first scan mode having a first scan rate and the first communication system providing communication via a cellular network; and subsequent to performing the scan in the first scan mode, perform one or more scans in a second scan mode for a signal from a second of the plurality of communication systems providing communication via a local area network, the second scan mode having a second scan rate lower than the first scan rate of the first scan mode, wherein the second scan mode is based on the property of the detected event.

13. The apparatus of claim 11, wherein the detected event is detected based on determining that a flip cover of the apparatus has been closed.

14. The apparatus of claim 11, wherein the detected event is detected based on determining that a key other than a volume key or a power key of the apparatus has been pressed.

15. The apparatus of claim 11, wherein the detected event is detected based on determining that the apparatus has been connected to a charger and that a keypad of the apparatus is unlocked.

16. The apparatus of claim 11, wherein the detected event is detected based on determining that a charger has been disconnected from the apparatus.

17. A method, comprising:

storing, in a device configured to operate in a plurality of wireless communication systems, data defining a plurality of events, and associating each of the plurality of events with a type of scanning mode, wherein at least two of the plurality of events are associated with the same scanning mode;

detecting an event at the device, the detected event corresponding to one of the plurality of events;

responsive to detecting the event, first scanning for a wireless signal from a first of the wireless communication systems based on a property of the detected event, wherein the first wireless communication system provides communication via a wireless local area network;

after performing the first scanning, second scanning for a wireless signal from a second of the wireless communication systems, wherein the second scanning is performed at a rate lower than a rate of the first scanning, wherein the second communication system provides communication via a cellular network; and after performing the second scanning, third scanning for a wireless signal within the first wireless communication system, wherein the third scanning is performed at a rate lower than the rate of the second scanning, wherein the second scanning is based on the property of the detected event.

18. The method of claim 5, wherein the detected event is detected based on detecting a loss of external power.

19. The non-transitory computer-readable storage medium of claim 10, wherein the detected event is detected based on detecting a loss of external power.

20. The apparatus of claim 12, wherein the detected event is detected based on detecting a loss of external power.

21. The method of claim 17, wherein the detected event is detected based on detecting a loss of external power.

* * * * *

UNITED STATES PATENT AND TRADEMARK OFFICE
CERTIFICATE OF CORRECTION

| | | |
|---|---|---|
| PATENT NO. | : 8,326,290 B2 | |
| APPLICATION NO. | : 11/333856 | |
| DATED | : December 4, 2012 | |
| INVENTOR(S) | : Juha Mortti et al. | |

It is certified that error appears in the above-identified patent and that said Letters Patent is hereby corrected as shown below:

Column 7, Claim 12, Line 14:

Please replace "store, data defining" with --store data defining--

Signed and Sealed this
Second Day of April, 2013

Teresa Stanek Rea
*Acting Director of the United States Patent and Trademark Office*